7621X
A. Canfield.
Truss Bridge.
No
Patented Jun. 29, 1833.
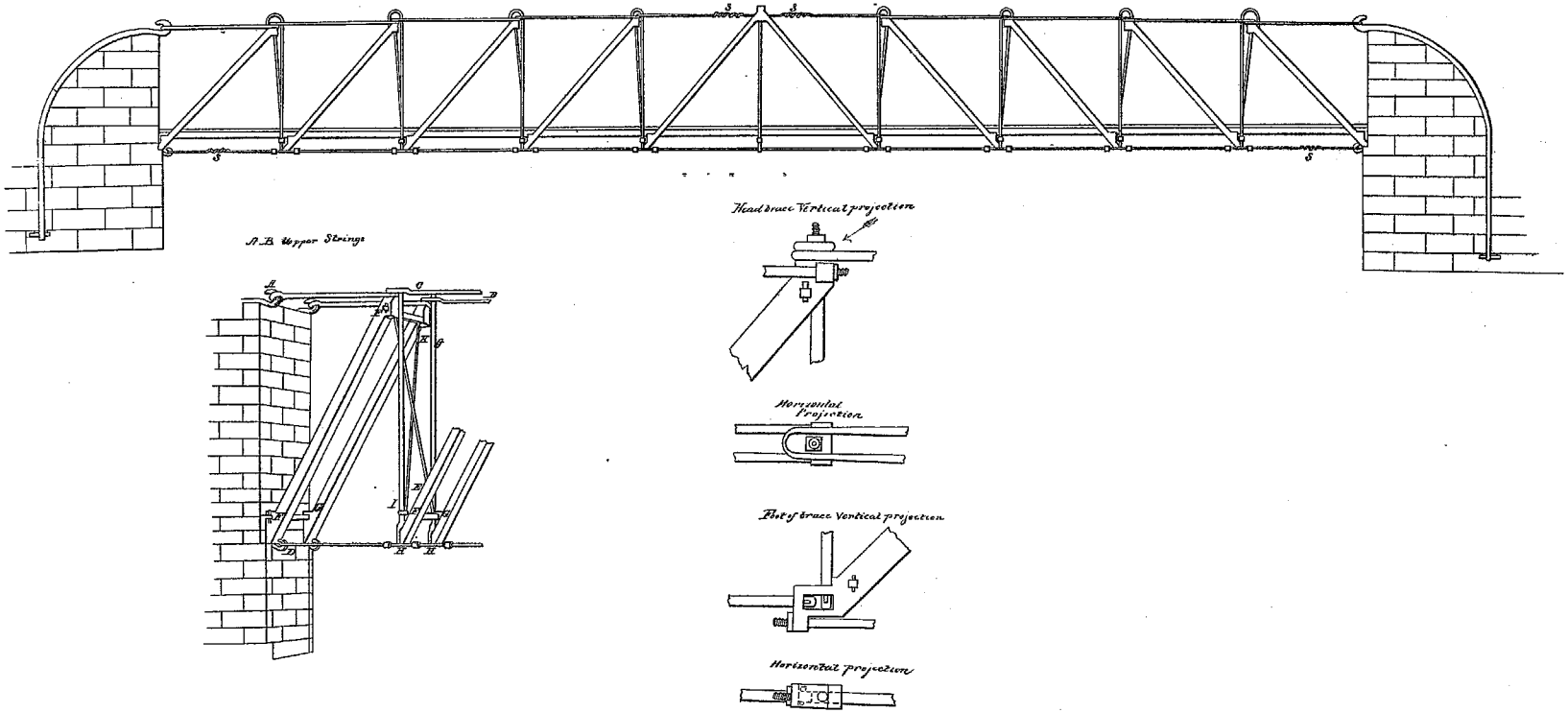
N. PETERS, PHOTO-LITHOGRAPHER, WASHINGTON, D. C.

[illegible] June 29. 1833 [illegible]

Augustus Canfield

The schedule referred to in these Letters Patent and making part of the same containing a description in the words of the said Augustus Canfield himself of his improvement in the Construction of Iron Bridges.

The upper horizontal pieces I call the upper strings, the lower horizontal pieces the lower strings, the upper pieces the posts. All these may be either chains or bars, the oblique pieces I call the braces. - The bars connecting the braces, the cross bars. - The pieces running from the upper cross bars to the lower part of the post on the opposite side of the frame, the lateral braces - The lower end of the braces rest on the foot pieces - The pieces, bars &c are numbered from the abutment 1.2.3.&c The first upper strings are firmly attached to the abutments and to the head of the first brace. To the head of the first brace the head of the first post is attached & also the second upper string - To the foot of the first post is attached the first foot piece in which rests the foot of the second brace - The head of the second brace is sustained by the second upper string running from the head of the first brace. The first foot pieces are prevented from moving horizontally by the second lower strings &c so that when the bridge is up the upper strings are acted on by a direct tension from the abutments & the lower strings by a tension from the centre of the span. The floor timbers rest on bars or beams supported by the lower cross bars - The floor to be of either iron or wood. The lower springs between the abutment and the foot of the second brace may be put in or not as from a weight on the centre of the bridge there is no strap on them. And also the upper strings from the head of the centre brace to the next brace on each side, for the same reason — This leaves every part at liberty to contract or expand without any strain. I propose to connect the parts last named by a spiral spring that will yield an inch or two under a tension of one or two tons. Any number of strings and braces may be put in one frame or one side of the road way. As in this construction the stress upon each part by any given pressure is a matter of simple calculation, As the contraction and expansion are effectually provided for As the iron acts with its greatest strength, viz, a direct tension or a direct thrust, there being not the slightest lateral strain & as it appears to possess every requisite in a bridge. The Inventor believes this to be the best arrangement of the materials that can be made Witnesses
S. D. Canfield
Jacob Collin
(Dr in port folio)

Augustus Canfield

Exd. J.S.

(528 words)